United States Patent [19]

Niederst et al.

[11] Patent Number: 5,681,628

[45] Date of Patent: *Oct. 28, 1997

[54] PRESSURIZABLE THERMOPLASTIC CONTAINER HAVING AN EXTERIOR POLYURETHANE LAYER AND ITS METHOD OF MAKING

[75] Inventors: Ken W. Niederst, Allison Park; John R. Zern, Cheswick; Jerome A. Seiner, Pittsburgh, all of Pa.

[73] Assignee: PPG Industries, Inc., Pittsburgh, Pa.

[*] Notice: The term of this patent shall not extend beyond the expiration date of Pat. No. 5,300,334.

[21] Appl. No.: 172,987

[22] Filed: Dec. 27, 1993

Related U.S. Application Data

[63] Continuation of Ser. No. 991,484, Dec. 16, 1992, Pat. No. 5,300,334, which is a continuation of Ser. No. 691,660, Apr. 26, 1991, abandoned.

[51] Int. Cl.$^6$ ................................................. B65D 23/08
[52] U.S. Cl. .................. 428/35.7; 428/36.6; 428/36.8; 428/423.1; 428/423.7; 215/12.2
[58] Field of Search .................. 428/35.7, 423.1, 428/423.7, 36.6, 36.8; 215/1 C, 12.1, 12.2

[56] References Cited

U.S. PATENT DOCUMENTS

| | | | |
|---|---|---|---|
| 4,569,869 | 2/1986 | Kushida et al. | 428/35.7 |
| 4,731,289 | 3/1988 | Coleman | 428/334 |
| 4,751,120 | 6/1988 | Yazaki et al. | 428/35.7 |
| 4,785,948 | 11/1988 | Strassheimer | 215/1 C |
| 4,980,211 | 12/1990 | Kushida et al. | 428/36.7 |

*Primary Examiner*—Rena Dye
*Attorney, Agent, or Firm*—William J. Uhl; Dennis G. Millman; Paul S. Chirgott

[57] ABSTRACT

Pressurizable thermoplastic containers, such as those made from polyethylene terephthalate containing a polyurethane layer on the exterior surface thereof are disclosed. The polyurethane layer which is typically applied by a coating process provides the bottle with resistance to stress cracking. The containers are useful as refillable bottles for carbonated beverages which have a tendency to stress crack.

9 Claims, No Drawings

PRESSURIZABLE THERMOPLASTIC CONTAINER HAVING AN EXTERIOR POLYURETHANE LAYER AND ITS METHOD OF MAKING

This is a continuation of application Ser. No. 07/991,484, filed Dec. 16, 1992, now U.S. Pat. No. 5,300,334, which is a continuation of application Ser. No. 07/691,660, filed Apr. 26, 1991, now abandoned.

BACKGROUND OF THE INVENTION

Field of the Invention: The invention relates to thermoplastic containers such as bottles, and more particularly, to such containers with outer layers of a dissimilar material so as to provide improved properties to such container. The invention also relates to a process for preparing such containers.

Brief Description of the Prior Art: Blow molded, plastic bottles such as those made from polyethylene terephthalate have largely replaced heavier glass bottles previously used for carbonated beverages and the like. One disadvantage associated with plastic bottles is the extremely thin wall construction of the body of the bottle. The bottles are inherently weak which prevents them from being returned to the bottler and refilled.

In an attempt to overcome the above-mentioned disadvantages, the plastic bottle industry has been manufacturing plastic bottles of a one-piece construction with thicker body walls. This makes the bottles stronger enabling them to be returned to the bottler for refilling.

However, in manufacturing bottles of a one-piece construction with thicker walls, it has been found that such bottles have a serious stress cracking problem associated with them. Stress cracking is the development of fine cracks which are the result of the release of stresses introduced into the bottle during the molding process. Such bottles are manufactured by the blow molding process which stresses the more rigid side walls of the bottles. The stress is particularly in the base area of the bottles which is complexly configured so as to make the bottle free standing. The complex shapes are difficult to mold without stress. In addition, it has been found that stress introduced into the bottles in the blow molding process is accentuated when the bottles are returned to the bottler for reuse. Before refilling the returned bottles, the bottles are given a hot caustic wash and after a number of washes and refillings involving pressurizing the bottles and abrading the base area of the bottle on a conveyor, hazing or stress cracking develops almost exclusively on the exterior surfaces of the bottle. If severe enough, the stress cracking can result in loss of pressure and premature rupturing of the bottles.

It has been found that this stress cracking can be significantly minimized by applying to the exterior surface of the thermoplastic bottles a protective layer of a polyurethane.

SUMMARY OF THE INVENTION

In accordance with the invention, a pressurizable thermoplastic container with a polyurethane layer on its exterior surface is provided. The container can be subjected to multiple hot caustic washings and refillings with carbonated beverages with minimal, if any, stress cracking. Such containers can be prepared by applying, typically by a coating process, a continuous film of a polyurethane over the exterior surface of the thermoplastic container.

PRIOR ART

U.S. Pat. No. 2,830,721; 2,836,318 and 2,836,319 disclose plastic containers such as polyethylene with an internal and/or an exterior coating of a cured epoxy resin to prevent permeation of the polyethylene by organic liquids.

U.S. Pat. No. 2,860,801 and 2,985,542 disclose containers such as polyethylene plastic containers containing a coating based on a vinyl chloride-vinyl acetate-vinyl alcohol terpolymer and an alcoholic-type urea-formaldehyde resin to prevent permeation of the polyethylene by organic liquids.

U.S. Pat. No. 3,279,940 discloses polyethylene and polypropylene containers coated with a polyester resin to improve appearance, abrasion resistance, barrier properties, printability and other characteristics.

U.S. Pat. No. 3,823,032; 4,093,759 and 4,409,266 disclose glass bottles coated with an outer polyurethane layer to prevent scattering of broken glass.

U.S. Pat. No. 4,069,933 discloses a polyethylene terephthalate bottle for carbonated beverages having an interior liquid contacting surface having an effective wetting amount of oleic acid to cover microflaws to reduce nucleation and carbonation loss.

U.S. Pat. No. 4,569,869 discloses a polyethylene terephthalate bottle having a UV-cured methyl methacrylate resin outer coating for better wear resistance and smoothness.

U.S. Pat. No. 4,496,517 discloses a process for preparing a polyethylene terephthalate bottle whereby the residual strain of the bottle is reduced by controlling the temperature in the blow molding process.

DETAILED DESCRIPTION

The pressurizable thermoplastic materials used in the container construction of the present invention are those which are capable of being blow molded to a rigid structure such that they can withstand being pressurized, typically by containing carbonated beverages. The pressurizable thermoplastic material should be able to withstand up to 100 psi (gauge) pressure. Such materials include crystalline polyolefins such as high density polyethylene and polypropylene and preferably orientable thermoplastic materials, that is, a plastic material which when oriented such as by blow molding increases in strength. Examples of saturated polyesters would be polyethylene terephthalate and other thermoplastic materials of the polyester or polyamide type such as polyhexamethylene adipamide, polycaprolactam, polyhexamethylene sebacamide, poly(ethylene)-2,6- and 1,5-naphthalate and poly(tetramethylene)-1,2-dioxybenzoate. The preferred thermoplastic is polyethylene terephthalate.

The containers of the present invention are manufactured by the blow molding process in which a thermoplastic intermediate article is formed by injection molding. The intermediate article is of a tubular shape having an opening at its top. A neck portion at the top is shaped preferably in the same shape as that of the final product. A lower part intermediate is closed to form a bottom. After injection molding, the intermediate article is cooled and inserted into a blow mold and a perforated rod connected to a compressed air source inserted downwardly into the intermediate article through its neck portion. The assembly is sealed, the intermediate article heated while blowing air through the perforated rod to expand the intermediate article to the final shape of the container. After expansion of the intermediate article to the shape of the mold, the mold is then cooled and the bottle discharged.

The blow molding process is conducted such that the resultant blow molded container has a relatively thick wall construction, typically on the order of 22 to 26 mils for returnable bottles or a relatively thin wall construction, typically on the order of 12 to 15 mils for non-returnable bottles. For returnable bottles, the amount of plastic contained in the containers of the present invention is approximately twice as much as that which is used with non-returnable thermoplastic containers, typically for a polyethylene terephthalate bottle from 55 to 60 grams per 2-liter bottle as opposed to about 110–115 grams per 2-liter bottle in a returnable polyethylene terephthalate bottle. In addition, the base portion of the bottle contains a base enabling the bottle to be self-standing. Typically, the base can be in the so-called champagne base variety having a rim portion surrounding an inwardly sloping base portion such as are described in U.S. Pat. No. 4,780,257. Alternately, the bottle can be blow molded in a way such that it has a number of protruding feet molded into the base area. Such bottles are well known in the art and are manufactured by Johnson Controls Inc. as BIG FOOT bottles.

The polyurethanes which are useful in the practice of the invention are preferably thermosetting polyurethanes such as those based on a polymeric polyol and an organic polyisocyanate including blocked polyisocyanates. Moisture-curable polyurethanes can also be used. Examples of polymeric polyols are polyether polyols, polyester polyols, acrylic polyols and mixtures thereof. The preferred polyols are polyester polyols and acrylic polyols because they provide the best balance of properties to the molded bottles such as hardness, scratch resistance, durability, adhesion, flexibility and alkali resistance. Examples of organic polyisocyanates are monomeric polyisocyanates and polymeric isocyanates, with polymeric polyisocyanates being preferred because they are less likely to leave extractable low molecular weight materials.

Examples of polyester polyols are those prepared by the polyesterification of an organic polycarboxylic acid or anhydride thereof with organic polyols and/or an epoxide. Usually, the polycarboxylic acids and polyols are aliphatic or aromatic dibasic acids and diols.

The diols which are usually employed in making the polyester include acyclic alkylene glycols, such as ethylene glycol, neopentyl glycol and cyclic glycols such as hydrogenated bisphenol A, cyclohexanediol and cyclohexanedimethanol. Polyols of higher functionality can also be used. Examples include trimethylolpropane and pentaerythritol, as well as higher molecular weight polyols such as those produced by oxyalkylating low molecular weight polyols.

The acid component of the polyester consists primarily of monomeric carboxylic acids or anhydrides having 2 to 18 carbon atoms per molecule. Among the acids which are useful are phthalic acid, terephthalic acid, hexahydrophthalic acid, adipic acid, azelaic acid, sebacic acid, maleic acid, glutaric acid, chlorendic acid, decanoic acid and dodecanoic acid. There may be employed higher polycarboxylic acids such as trimellitic acid and tricarballylic acid. Where acids are referred to above, it is understood that anhydrides of those acids which form anhydrides can be used in place of the acid. Also, lower alkyl esters of the acids such as dimethyl glutarate and dimethyl terephthalate can be used.

Besides polyester polyols formed from polybasic acids and polyols, polylactone-type polyesters can also be employed. These products are formed from the reaction of a lactone such as epsilon-caprolactone and an active hydrogen-containing compound such as a polyol. Such products are described in U.S. Pat. No. 3,169,945 to Hostettler.

In addition to the polyester polyols, hydroxy-containing acrylic polymers or acrylic polyols can be used as the polyol component.

Among the acrylic polymers are interpolymers of about 2 to 30 percent by weight hydroxy-containing vinyl monomers such as hydroxyalkyl acrylate and methacrylate having 2 to 6 carbon atoms in the alkyl group and 90 to 99.8 percent by weight of other ethylenically unsaturated copolymerizable materials such as alkyl acrylates and methacrylates; the percentages by weight being based on the total weight of the monomeric charge.

Examples of suitable alkyl acrylates and methacrylates are methyl methacrylate, lauryl methacrylate, 2-ethylhexyl methacrylate and n-butyl acrylate.

Besides the acrylates and methacrylates, other copolymerizable monomers which can be copolymerized with the hydroxyalkyl acrylates and methacrylates are ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, alpha-methyl styrene, alpha-methyl chlorostyrene, vinyl butyrate, vinyl acetate, allyl chloride, divinyl benzene, diallyl itaconate, triallyl cyanurate and mixtures thereof. Usually these other ethylenically unsaturated materials are used in admixture with the above-mentioned acrylates and methacrylates.

Examples of polyether polyols are polyalkylene ether polyols which include those having the following structural formula:

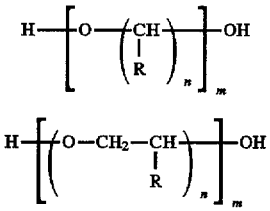

where the substituent R is hydrogen or lower alkyl containing from 1 to 5 carbon atoms including mixed substituents, and n is typically from 2 to 6 and m is from 10 to 100 or even higher. Included are poly(oxytetramethylene) glycols, poly(oxyethylene) glycols, poly(oxy-1,2-propylene) glycols and the reaction products of ethylene glycol with a mixture of 1,2-propylene oxide and ethylene oxide.

The polyisocyanates which may be used in the practice of the invention include aromatic and aliphatic polyisocyanates with aliphatic polyisocyanates being preferred because of their superior ultraviolet light stability and non-yellowing tendencies. Examples of suitable polyisocyanates include monomeric polyisocyanates such as toluene diisocyanate and 4,4'-methylene-bis-(cyclohexyl isocyanate), isophorone diisocyanate and NCO-prepolymers such as the reaction products of monomeric polyisocyanates such as those mentioned above with polyester or polyether polyols. Particularly useful isocyanates are the isocyanurate from isophorone isocyanate commercially available from Chemische Werke Huls AG as T1890 and the isocyanurate from 1,6-hexamethylene diisocyanate commercially available from Bayer as DESMODUR N.

Polyfunctional isocyanates with free isocyanate groups can be used to form two-package room temperature curable systems. In these systems, the polyester and isocyanate curing agents are mixed just prior to their application. Two-package systems are preferred because of their reactivity at low temperature and the fact that they will be applied to temperature-sensitive plastic substrates. The polyurethane layer can be applied to the exterior surface of the thermoplastic substrate as a continuous film by a coating process. For coating applications, a liquid diluent is usually present with the polyurethane to form a coating composition. By liquid diluent is meant a solvent or non-solvent which is volatile and is removed after the coating is applied and is needed to reduce viscosity sufficiently to enable forces available in simple coating techniques, that is, brushing and spraying, to spread the coating to controllable, desired and uniform thicknesses. Generally, a diluent is present in the composition in amounts of about 20 to 90, preferably 50 to 80 percent by weight based on total weight of diluent and polyurethane. Examples of suitable liquid diluents are those which will not attack the thermoplastic bottle and include aromatic hydrocarbons such as toluene and xylene, ketones such as methyl amyl ketone and methyl isobutyl ketone.

When water is employed as a diluent either alone or in admixture with water-miscible solvents, the compositions of the invention should be modified so that they are dispersible in the aqueous diluent. This can be accomplished by the use of externally added emulsifier incorporating water-solubilizing groups such as ethylene oxide moieties or ionic salt groups into one or more of the components of the present invention. Examples of suitable ionic salt groups are:

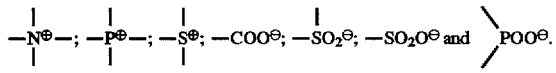

The ionic salt groups can be incorporated into the components of the coating compositions by techniques well known in the art such as described in U.S. Pat. No. 4,147,679 to Scriven et al and in U.S. Pat. No. 3,479,310 to Dieterich et al. Waterborne polyurethanes should be well crosslinked. Gationic polyurethanes are preferred because of their resistance to caustic.

For low temperature curing a catalyst such as a tin compound, for example, dibutyltin dilaurate, is usually present in the coating compositions. The catalyst is typically used in amounts of 0.25 to 0.30 percent by weight based on weight of resin solids.

In addition to a diluent, the coating composition will usually contain ingredients such as anti-oxidants, ultraviolet light absorbers, flow control agents, slip agents and anti-mar agents. These materials will typically constitute about 2–10 percent by weight of the coating composition based on weight of resin solids. The anti-oxidant and ultraviolet light absorber protect the bottle from the effects of exterior weathering which causes yellowing of the bottle and poor caustic resistance. The slip agents and anti-mar agents provide abrasion and scratch resistance to the bottle and any printed labels on the bottle.

The coating compositions can be applied by conventional methods including brushing, dipping, flow coating, etc., but preferably are applied by spraying. Usual spray techniques and equipment are used.

The coating operation may be conducted either in a single stage or by a multiple stage coating procedure as is well known in the art. Satisfactory results can be obtained with coatings having a dry film thickness of from about 0.2 to 1.5 mils, preferably from about 0.5 to 0.8 mils. Coating thicknesses less than 0.2 mils are not desired because they provide insufficient resistance to stress cracking and to abrasion. Coating thicknesses greater than 1.5 mils are not desired because of difficulty in curing such coatings in short periods of time. The coating can be applied to the entire exterior surface of the bottle or to portions of the bottle. For example, with non-returnable polyethylene terephthalate bottles with the protruding feet molded into the base area, stress cracking is a particular problem in the areas between the feet. Application of the polyurethane coating in the base area only dramatically increases the resistance to stress cracking. Since the bottle is non-returnable and will not be subjected to repeated caustic washing and pressurized refilling, coating the remaining portions of the bottle is not necessary.

The conditions adopted for curing the thermosetting polyurethane vary somewhat according to the thickness of the coating, the composition of the polyurethane including the presence or absence of catalyst and the sensitivity of the thermoplastic to temperature. Typically, the coating is cured at a temperature of from about 20° to 60° C. for about 30 seconds to 4 hours. Generally, lower temperatures require longer cure times. For example, room temperature compositions (20°–25° C.) usually require a 20 minute to 4 hour time period to develop sufficient cure. Infrared heating can be used to shorten the time to handleability.

The following Examples and Comparative Example illustrate the present invention in greater detail but it should not be taken as limiting the invention to their specific details. All parts and percentages are by weight unless otherwise indicated.

In Examples 1–5, various polyurethane coating compositions were prepared and applied to returnable polyethylene terephthalate bottles which were prepared by the blow molding technique. Comparative Example 6 shows the preparation of a thermosetting epoxy-amine coating composition which was also applied to a polyethylene terephthalate bottle. The coatings were cured and the coated bottles evaluated for stress cracking by subjecting them to multiple cycles of hot caustic washing, pressurizing and conveyor abrasion. The results are reported in the Table following the Examples.

EXAMPLE 1

A two-package polyurethane coating composition based on an acrylic polyol and an aliphatic polyisocyanate was prepared from the following ingredients:

| Ingredients | Parts by Weight (in grams) |
| --- | --- |
| Acrylic Polyol Package | |
| Acrylic polyol[1] | 4807.87 |
| TINUVIN 328[2] | 70.27 |
| TINUVIN 292[3] | 70.27 |
| Wax[4] | 23.4 |
| Dibutyltin dilaurate | 7.06 |
| Methyl amyl ketone | 600.43 |
| Silicone[5] | 9.37 |
| Methyl isobutyl ketone | 4202.85 |
| Polyisocyanate Package | |
| DESMODUR N-3300[1a] | 1317.87 |

[1]Acrylic polyol available from Henkel Corporation under the trademark G-CURE.
[2]TINUVIN 328 is a substituted benzotriazole anti-oxidant available from Ciba-Geigy Corporation.
[3]TINUVIN 292 is a hindered amine ultraviolet light stabilizer available from Ciba-Geigy Corporation.
[4]Wax available from Diamond Shamrock Company as S-379N3.
[5]Silicone available from General Electric Corp. as SF-1023.
[1a]Isocyanurate from 1,6-hexamethylene diisocyanate available from Mobay Chemical Company.

The two packages were stirred together to form a coating composition which was spray applied to a 1.5 liter polyethylene terephthalate refillable carbonated beverage bottle. The coating was cured in an electric fired oven at 60° C. for 10 minutes. The bottles were evaluated for stress cracking by subjecting them to cyclic testing consisting of hot caustic washing, pressurizing and conveyor abrasion. The results of the testing are reported in the Table below.

EXAMPLE 2

A two-package polyurethane coating composition based on the polyester polyol and an aliphatic polyisocyanate was prepared from the following ingredients:

| Ingredients | Parts by Weight (in grams) |
|---|---|
| Polyester Polyol Package | |
| Polyester polyol[1] | 2639.17 |
| TINUVIN 328 | 77.78 |
| TINUVIN 292 | 77.78 |
| S-379N3 wax | 25.89 |
| Dibutyltin dilaurate | 1.27 |
| Methyl amyl ketone | 819.20 |
| Methyl isobutyl ketone | 4800.34 |
| SF-1023 | 10.40 |
| Polyisocyanate Package | |
| DESMODUR N 3300 | 2658.58 |

[1]Polyester polyol obtained from condensing a polycaprolactone triol (PCP-0301 from Union Carbide Corporation) and azelaic acid in a 2:1 molar ratio.

The two packages were stirred together to form a coating composition which was spray applied to a 1.5 liter polyethylene terephthalate refillable carbonated beverage bottle. The coating was cured in an electric fired oven at 60° C. for 15 minutes. The coated bottles were evaluated for stress cracking as described in Example 1. The results are reported in the Table below.

EXAMPLE 3

A two-package polyurethane coating composition based on a mixture of polyester polyols and aliphatic polyisocyanates was prepared from the following ingredients:

| Ingredients | Parts by Weight (in grams) |
|---|---|
| Polyol Package | |
| Polyester polyol of Example 2 | 158.90 |
| Polycaprolactone polyol[1] | 59.50 |
| TINUVIN 328 | 6.45 |
| TINUVIN 292 | 6.45 |
| SLIP-AYD SL18[2] | 10.75 |
| Dow Corning Additive 11[3] | 0.43 |
| Methyl amyl ketone | 119.29 |
| Methyl isobutyl ketone | 286.31 |
| Polyisocyanate Package | |
| DESMODUR N 3300 | 210.0 |
| CORONATE 2094[1] | 25.40 |
| Dibutyltin dilaurate | 1.07 |

[1]The polycaprolactone polyol was obtained from ring opening epsilon-caprolactone with dimethylhydantoin (DANTOCOL DHE) in about a 1 to 1 weight ratio, number average molecular weight 400-500.
[2]SLIP-AYD SL18 is a polyethylene dispersion in 2-butoxyethanol from Daniels Products.
[3]Dow Corning Additive 11 is a silicone glycol (10% by weight in toluene).
[1]CORONATE 2094 is a difunctional prepolymer of 1,6-hexamethylene diisocyanate available from Tosoh USA Inc. through Nippon Polyurethane Industry Co., Ltd.

The two packages were stirred together to form a coating composition which was spray applied to a 1.5 liter polyethylene terephthalate refillable carbonated beverage bottle. The coating was cured in an electric oven at 60° C. for 15 minutes. The coated bottles were evaluated for stress cracking as described in Example 1. The results are reported in the Table below.

EXAMPLE 4

A two-package polyurethane coating composition based on a mixture of a polycarbonate polyol and a polyisocyanate was prepared from the following ingredients:

| Ingredients | Parts by Weight (in grams) |
|---|---|
| Polyol Package | |
| Polycarbonate Polyol[1] (70% solution in methyl amyl ketone) | 26.06 |
| Methyl isobutyl ketone | 21.33 |
| TINUVIN 328 | 0.50 |
| TINUVIN 292 | 0.50 |
| SLIP-AYD SL18 | 0.83 |
| Dow Corning Additive 11 | 0.03 |
| Polyisocyanate Package | |
| Isocyanurate derived from isophorone diisocyanate[1] (70% solids in a 2/1 blend of SOLVESSO 100[2]/n-butyl acetate) | 21.33 |
| Dibutyltin dilaurate | 0.08 |

[1]Polycarbonate Polyol is commercially available from PPG Industries, Inc. as DURACARB 120.
[1]Available from Chemische Werke Huls AC as T1890L.
[2]SOLVESSO 100 is a high boiling naphtha (b.p. range 332–350° F.) available from Exxon Co.

The two packages were stirred together to form a coating composition which was spray applied to a 1.5 liter polyethylene terephthalate refillable carbonated beverage bottle. The coating was cured in an electric oven at 60° C. for 15 minutes. The coated bottles were evaluated for stress cracking as described in Example 1. The results are reported in the Table below.

EXAMPLE 5

A moisture-curable polyurethane coating composition was prepared from the following mixture of ingredients:

| Ingredients | Parts by Weight (in grams) |
|---|---|
| Moisture-curable polyurethane[1] | 487.5 |
| TINUVIN 328 | 2.9 |
| TINUVIN 292 | 2.9 |
| Wax of Example 1 | 0.58 |
| Dibutyltin dilaurate | 0.1 |
| Xylene | 155.0 |

[1]Moisture-curable polyurethane available from Spencer Kellogg as SPEN-LITE M22-X-40.

The coating composition was spray applied to a 1.5 liter polyethylene terephthalate refillable carbonated beverage bottle. The coating was permitted to cure at 60° C. for 15 minutes. The coated bottles were then evaluated for stress cracking as described in Example 1. The results are reported in the Table below.

Comparative Example 6

For the purposes of comparison a two-package thermosetting polyepoxide-polyamine coating composition was prepared and used to coat polyethylene terephthalate bottles as generally described in Examples 1–5. The coating composition was prepared from the following ingredients:

| Ingredients | Parts by Weight (in grams) |
|---|---|
| Polyepoxide Package | |
| EPON 828[1] | 27.44 |
| DOWANOL PM[2] | 33.76 |
| SF-1023 | 0.02 |
| TINUVIN 328 | 0.52 |
| TINUVIN 292 | 0.52 |
| SLIP-AYD SL18 | 0.86 |
| Dow Corning Additive 11 | 0.04 |
| Amine Package | |
| ANCAMINE 1916[1] | 6.86 |

[1]EPON 828 is a diglycidyl ether of bisphenol A available from Shell Chemical Company.
[2]DOWANOL PM is propylene glycol monomethyl ether available from Dow Chemical Co.
[1]ANCAMINE 1916 is an epoxy-amine adduct available from Pacific Anchor Chemical Co.

The two packages were stirred together to form a coating composition which was spray applied to a 1.5 liter polyethylene terephthalate refillable carbonated beverage bottle that was corona treated before coating with a Model BD-20 Treater from Electro-Technics Products, Chicago, Ill. The coating was cured in an electric oven at 60° C. for 20 minutes. The coated bottles were evaluated for stress cracking as described in Example 1. The results are reported in the Table below.

Testing for Stress Cracking

After the coating composition has been applied to the polyethylene terephthalate bottles and cured, the coated bottle is aged for about 16 hours at ambient conditions and the bottles tested by exposing them to the following cycle.

Caustic Wash: The bottles are soaked in a 3–4 percent by weight sodium hydroxide solution which contains about 0.2 percent by weight of a surfactant (Henkel P3 STABILON AL FLUESSIG) at a temperature of 138°–140° F. (59°–60° C.) for 15 minutes.

Pressurizing: After the bottles are removed from the caustic immersion, they are given a rinse with tap water and three-quarters filled with tap water. Air pressure is applied to simulate carbon dioxide pressures with a gauge reading of 60 psi and held for 3 minutes.

Abrasion Testing on Conveyor: After the pressure is released but while the bottles are still three-quarters filled with tap water, the bottles are put on a stainless steel track conveyor which is lubricated (with 0.25 percent by weight solution of Henkel P3 KET-W5). The bottles remain stationary on the conveyor while the lubricated steel conveyor moves under them for four minutes at up to 60 feet per minute. This part of the cycle abrades the coating in the base area of the bottle as might happen on a filling line in a bottling plant.

The coated bottles are subjected to up to 30 cycles (caustic washing-pressurizing-abrasion testing=1 cycle) of testing and then examined for stress cracking. The results are reported in Table I below.

TABLE I

| Coated Bottle of Example | Results |
|---|---|
| 1 | Passes 20 cycles with good retention of clarity and adhesion, very few stress cracks in base area |
| 2 | Same as Example 1 |
| 3 | Passes 15 cycles with good retention of clarity and adhesion, few stress cracks in base area |
| 4 | Same as Example 1 |
| 5 | Same as Example 1 |
| Comparative Example 6 | Passes 10 cycles with good retention of clarity but beyond that point large stress cracks appear. Also, more loss of adhesion than in Examples 1–5 |
| Control (polyethylene terephthalate bottle with no coating) | Passes only 3–5 cycles before extensive stress cracking is observed |

Note, all bottles with coatings show various degrees of wear through of coatings from the conveyor testing. The ranking of the coatings for abrasion resistance is 1=2=4>3=5>6.

EXAMPLE 7

The following example shows the effect of coating only the base area of a non-returnable, stand alone, polyethylene terephthalate bottle with protruding feet (Johnson Controls BIG FOOT bottles), with the polyurethane coatings of Examples 1 and 2. The bottles were coated on their bottom areas only and the coating baked at 140° F. (60° C.) for 15 minutes. Coated bottles were filled to ninety (90) percent of their volume with tap water and air pressurized to 60 psig. The pressurized bottles were then soaked at 75°–80° F. (24°–27° C.) in deionized water and in a lubricating solution for various times as shown in Table II below and the effects of the soaking on stress cracking reported. As a control, an uncoated bottle was also tested. The results are reported in Table II below.

TABLE II

| | Soaking Liquid | | | Control |
|---|---|---|---|---|
| Test Time in Hours | Deionized Water | Lubricating Solution[1] | Coating of Example 1 | Coating of Example 2 | (no coating) |
| 1 | X | | | | no effect |
| 2 | X | | | | slight crazing |
| 4 | X | | | | slight crazing |
| 20 | X | | | | medium crazing |
| 1 | | X | | | medium crazing |
| 20 | | X | | | heavy crazing |
| 20 | | X | no effect | | heavy crazing |
| 40[2] | | X | no effect | | heavy crazing |
| 20 | | X | | no effect | heavy crazing |
| 40[2] | | X | | very slight crazing | heavy crazing |

[1]1.25 Percent by weight solution of Henkel P3 KET-W5.
[2]End of test.

We claim:

1. In a reusable thermoplastic container for carbonated beverages which is prepared by a blow molding technique and has a rigid structure such that the container can be pressurized; the container having a thick wall such that the container can be reused; the thermoplastic container having a tendency to stress crack after reuse and subsequent hot caustic washings and refillings with carbonated beverages; said thermoplastic container being further characterized as having a polyurethane layer derived from an organic polyisocyanate and a polymeric polyol selected from the group consisting of polyester polyols, polyether polyols, polycarbonate polyols, acrylic polyols, and mixtures thereof which is on the exterior surface thereof; said polyurethane layer comprising an ultraviolet light absorber and having a dry film thickness of 0.2 to 1.5 mils to provide resistance to the formation of microcracks.

2. The article of claim 1 in which the thermoplastic is a saturated polyester.

3. The article of claim 1 in which the saturated polyester is polyethylene terephthalate.

4. The article of claim 1 in which the polyurethane layer is derived from an organic polyisocyanate, a polymeric polyol and a catalyst for urethane formation.

5. The article of claim 1 in which the polyisocyanate is an aliphatic polyisocyanate.

6. The article of claim 1 in which the thermoplastic container has a wall thickness of 22 to 26 mils.

7. The article of claim 1 in which the polyurethane layer contains ingredients selected from the class consisting of anti-oxidants, slip agents, anti-mar agents and mixtures thereof.

8. A thermoplastic container which is prepared by a blow molding technique and has a structure such that the container can be pressurized, said thermoplastic container being further characterized as having on a surface thereof a polyurethane layer derived from an organic polyisocyanate and a polymeric polyol, said polyurethane layer comprising an ultraviolet light absorber and having a dry film thickness of 0.2 to 1.5 mils.

9. A container which can be pressurized, said thermoplastic container being further characterized as having on a surface thereof a polyurethane layer derived from an organic polyisocyanate and a polymeric polyol, said polyurethane layer comprising an ultraviolet light absorber and having a dry film thickness of 0.2 to 1.5 mils.

* * * * *

UNITED STATES PATENT AND TRADEMARK OFFICE
CERTIFICATE OF CORRECTION

PATENT NO. : 5,681,628
DATED : October 28, 1997
INVENTOR(S) : Ken W. Niederst, John R. Zern, and Jerome A. Seiner It is certified that error appears in the above-identified patent and that said Letters Patent is hereby corrected as shown below:

Claim 1, line 1 - Delete the word "In".

Signed and Sealed this

Eighth Day of August, 2000

Attest:

Q. TODD DICKINSON

*Attesting Officer*          *Director of Patents and Trademarks*